United States Patent [19]
Ohmori

[11] 4,433,849
[45] Feb. 28, 1984

[54] CONTROL CIRCUIT FOR A VEHICLE LEVELING SYSTEM

[75] Inventor: Taiji Ohmori, Saitama, Japan

[73] Assignee: Honda Giken Kogyo Kabushiki Kaisha, Tokyo, Japan

[21] Appl. No.: 319,471

[22] Filed: Nov. 9, 1981

[30] Foreign Application Priority Data

Nov. 13, 1980 [JP] Japan .............................. 55-159864
Nov. 14, 1980 [JP] Japan .............................. 55-160609

[51] Int. Cl.$^3$ .............................................. B60G 17/00
[52] U.S. Cl. .............................. 280/6 R; 267/64.28; 307/118; 310/DIG. 3
[58] Field of Search .................. 280/6 R, 6.1, 707; 267/64.28; 310/DIG. 3; 307/118

[56] References Cited

U.S. PATENT DOCUMENTS

| | | | |
|---|---|---|---|
| 4,164,664 | 8/1979 | Kasiewicz | 280/707 |
| 4,168,840 | 9/1979 | Graham | 280/707 |
| 4,333,668 | 6/1982 | Hendrickson et al. | 280/707 |

*Primary Examiner*—Richard A. Bertsch
*Attorney, Agent, or Firm*—Irving M. Weiner; Pamela S. Burt; John L. Shortley

[57] ABSTRACT

A control circuit for a vehicle levelling system including a detecting device for detecting a change in vehicle height with respect to a predetermined reference vehicle-height position and generating a directional signal and an adjustment-on or -off command signal. A control device is provided for controlling the operation of a mechanical system according to the signals, and a holding device is provided for holding the adjustment-off signal for a certain period of time even when the command signal has changed from the adjustment-off signal to the adjustment-on signal. In case a plurality of reference vehicle-height positions are provided, in order that the switching between the reference positions can be performed smoothly, there is provided a circuit for interrupting the function of the adjustment-off signal holding circuit temporarily according to the switching operation. Moreover, in order to decrease the number of detectors which constitute the detecting device, a signal conversion circuit is provided in the detecting device.

8 Claims, 5 Drawing Figures

CONTROL CIRCUIT FOR A VEHICLE LEVELING SYSTEM

BACKGROUND OF THE INVENTION (1) Field of the Invention

The present invention relates to a control circuit for a vehicle levelling system and more particularly to a control circuit for a vehicle levelling system having two or more reference vehicle-height positions and capable of switching over from one to another of such reference positions.

(2) Relevant Art

The present applicant has previously proposed a control circuit for a vehicle levelling system in commonly-assigned U.S. Pat. No. 4,391,452 is issued July 5, 1983. This proposed control circuit includes detecting means disposed in both front and rear portions of a vehicle for outputting a directional signal as a detected signal on the direction of change of the vehicle height and also for outputting a command signal for deciding whether a driving system for vehicle height adjustment is to be operated or not. With such signals provided from the detecting means the operation of the mechanical driving system is controlled so that the vehicle height at the front side and at the rear side of the vehicle is always at a reference level. This control circuit, which is shown in FIG. 5 of the accompanying drawings, will be described in detail hereinbelow with respect to the front portion of a vehicle and with reference to FIG. 5.

A directional signal $a_1$ indicating whether or not the vehicle height at the front side of a vehicle is within a preset reference range is fed from a detector $51a$ to a terminal $55a$, while a command signal $b_1$ indicating whether or not the foregoing driving system is to be operated is fed from a detector $51b$ to a terminal $55b$. The signals $a_1$ and $b_1$ are suitably combined in a logic circuit (A) to operate an actuator 53 for adjusting the front-side vehicle height and also to operate either a compression means (B) or a decompression means (C) whereby the front-side vehicle height is adjusted to a reference level. The rear-side vehicle height is also adjusted in the same manner; that is, a directional signal $a_2$ and a command signal $b_2$ are provided from detectors $52a$ and $52b$, respectively, and on the basis of a predetermined operation of the logic circuit (A) an actuator valve 54, etc. are operated. Actually, by the combination of the above four signals $a_1$, $b_1$, $a_2$ and $b_2$ there are performed a series of vehicle height adjustments with respect to one reference vehicle-height position.

In the aforesaid vehicle levelling system, two points are provided at the front and rear sides of a vehicle for adjusting the vehicle height, but only one reference vehicle height as the target of adjustment, namely, the vehicle height adjusting position, is provided. However, the vehicle height adjusting position is not limited to one; for example, if a pair of detectors which output a directional signal and a command signal are increased in number and input terminals $55a$, $56a$, $55b$, $56b$ of the control circuit are switched over selectively by means of a switching device, then it becomes possible to change the vehicle height to other desired positions. However, if a vehicle levelling system having such two or more reference vehicle height positions is constructed on the basis of the foregoing control circuit, the following problems occur when changing a detected signal relating to one reference vehicle height position into a detected signal relating to another reference vehicle height position by the switch-over operation of the aforesaid switching device.

The vehicle levelling system shown in FIG. 5 is constructed so that when the vehicle height is within a reference vehicle height range and thus is stable, a command signal (an OFF signal "1") for stopping the operation of the driving system is input to the terminals $55b$ and $56b$ of the control circuit. In case the connection relation is switched over from a detector relating to one reference vechicle height position to a detector relating to another reference vehicle height position, the above OFF signal disappears. In the foregoing vehicle levelling system, however, the control circuit is constructed such that even if the above OFF signal disappears at the terminals $55b$ and $56b$, it continues to exist for a certain period of time by the operation of holding circuits $K_1$ and $K_2$. Therefore, even if an ON signal is actually produced at the terminals $55b$ and $56b$, the operation for the vehicle height adjustment is interrupted for a certain period of time as mentioned above. This means that at the time of switching over reference vehicle height positions from one to another, the vehicle height adjusting operation is delayed. As a result, there occurs an observable shift and it is impossible to make an immediate vehicle height adjustment according to various changes, such as changes in the condition of a road surface, just after switching operation.

In the case of a control system wherein the front and rear portions of a vehicle are adjusted separately, the time required for adjusting the vehicle height from one level to another differs according to the weight distribution of the vehicle body, the capacity of a pressure source (e.g. air or oil pressure), etc. But, in general, when the vehicle body is light and the pressure source is of sufficient capacity, the time required for the vehicle height adjustment becomes the shortest. Therefore, in order for the vehicle levelling system to operate immediately and sufficiently at the time of switching over reference vehicle height positions selectively from one to another, it is desired that the OFF signal holding action be interrupted at least during the aforesaid period of time required for the vehicle height adjustment.

SUMMARY OF THE INVENTION

According to the present invention there is provided a control circuit for a vehicle levelling system including detecting means for detecting a change in vehicle height with respect to a predetermined reference vehicle-height position and generating a pair of control signals consisting of a directional signal and a command signal. The directional signal indicator whether the direction of displacement is upward or downward and the command signal indicates whether the vehicle height adjustment is to be made or stopped. A control circuit is provided for controlling the operation of a mechanical system to adjust the vehicle height to the aforesaid reference position according to the aforesaid control signals, and a holding circuit is provided which, when the command signal has changed from an adjustment-off signal to an adjustment-on signal, holds the adjustment-off signal for a certain period of time and then allows the adjustment-on signal to be transmitted to the above control circuit. According to the invention, the aforesaid detecting means is adapted to detect changes in vehicle height with respect to a plurality of different reference vehicle-height positions, and a switching means is mounted at the input section of the aforesaid control circuit for selecting any of the aforesaid plurality of reference vehicle-height positions. Also provided is a circuit for temorarily interrupting the function of the aforesaid holding circuit at the time of operation of the aforesaid switching means. The aforesaid detecting means is provided so as to generate the pair of control signals by a number corresponding to the number of the plurality of reference vehicle-height positions. In the detecting means, moreover, a set comprising a detector which generates the foregoing directional signal and a detector which generates the foregoing command signal may be provided in a number corresponding to the number of the plurality of reference vehicle-height positions. Furthermore, the detecting means may be constructed of a lesser number of detectors than the total number of control signals generated from the detecting means and there may be provided a circuit for converting input signals provided from the detectors into the control signals.

It is therefore an object of this invention to provide a control circuit for a vehicle levelling system having a plurality of reference vehicle-height positions and capable of switching over reference vehicle height positions from one to another wherein the function of an adjustment-off signal holding circuit is temporarily stopped, thereby permitting a smooth execution of the switch-over operation.

It is another object of this invention to provide a control circuit for a vehicle levelling system wherein, in the case of setting a plurality of reference vehicle-height positions, the number of detectors can be made less than the total number of adjustment control signals generated for detecting means, and which is inexpensive and simple in structure.

The above and other objects and advantages of this invention will become apparent from the following description of a preferred embodiment of the invention when read in conjunction with the accompanying drawings.

DETAILED DESCRIPTION OF THE INVENTION

Figure 1:
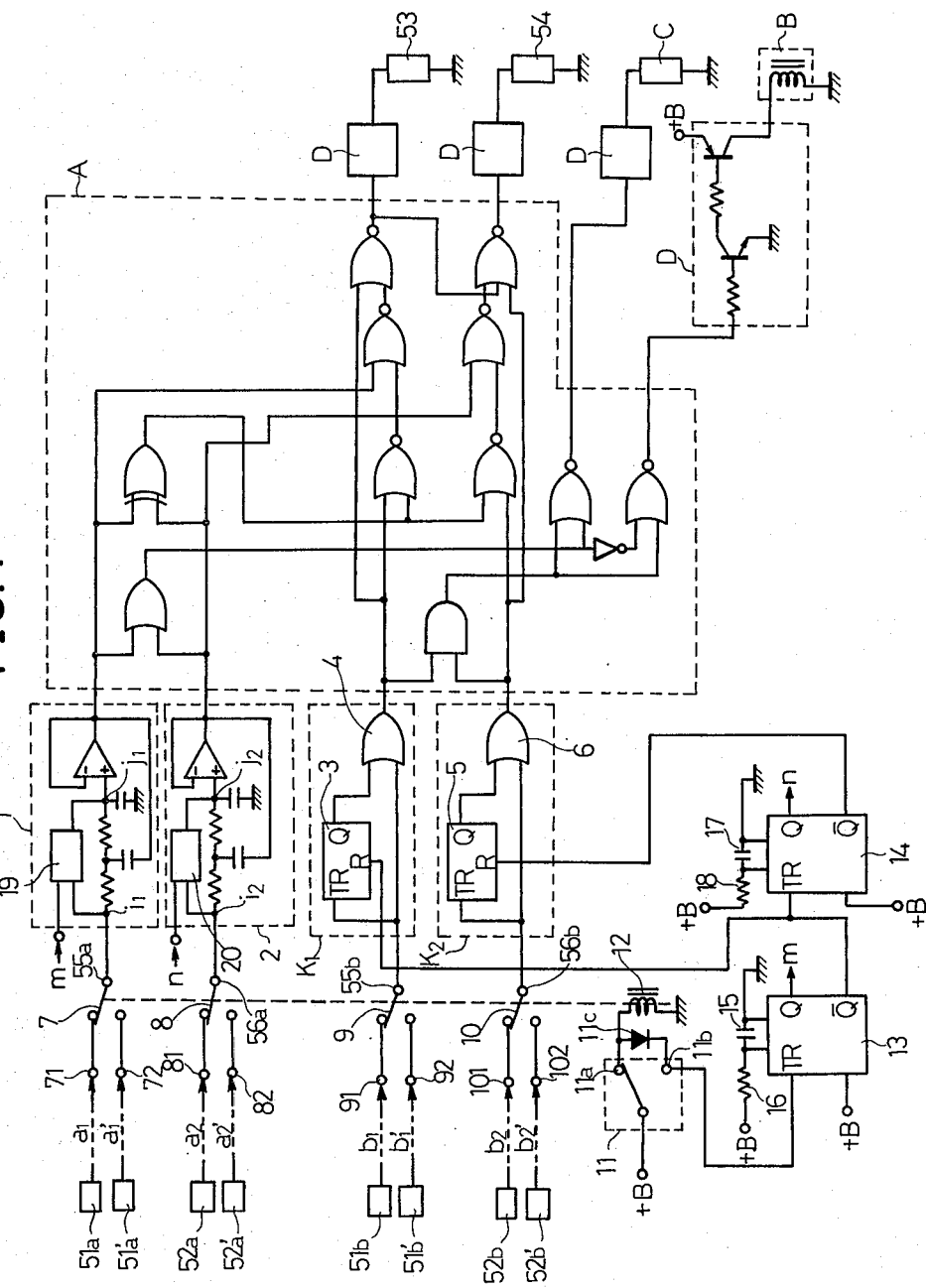
FIG. 1 is a connection diagram of a control circuit of a reference vehicle-height position switching type according to an embodiment of the present invention.

With reference to FIG. 1, reference numerals 1 and 2 designate low-pass filters and reference characters $K_1$ and $K_2$ designate OFF signal holding circuits comprising monostable multivibrators 3, 5 and OR gates 4, 6. To an input terminal 55a of the low-pass filter 1 there is fed a directional signal at a front portion of a vehicle and to an input terminal 56a of the lower-pass filter 2 there is fed a directional signal at a rear portion of the vehicle. Furthermore, to an input terminal 55b of the holding circuit $K_1$ there is fed a command signal at the front portion of the vehicle and to an input terminal 56b of the holding circuit $K_2$ there is input a command signal at the rear portion of the vehicle. Signals delivered from the low-pass filters 1, 2 and from the holding circuits $K_1$, $K_2$ are processed in a logic circuit (A) whereby a vehicle front actuator valve 53, a vehicle rear actuator valve 54, a compression means (B), and a decompression means (C) are operated. The reference character (D) shown in FIG. 1 designates a circuit for amplifying signals.

To the input terminals 55a, 56a of the low-pass filters 1, 2 and to the input terminals 55b, 56b of the holding circuits $K_1$, $K_2$ there are attached change-over contacts 7, 8, 9 and 10, respectively. The change-over contacts 7, 8, 9 and 10 are constructed so as to switch over from one position to the other when a relay coil 12 is energized or de-energized by the operation of a change-over switch 11. Thus, as a result of the provision of the change-over contacts 7, 8, 9 and 10 at the terminals 55a, 56a, 55b and 56b, respectively, the number of input terminals of the control circuit becomes eight. Directional signals $a_1$, $a_1'$, $a_2$ and $a_2'$ comprising a DOWN signal "0" and an UP signal "1" are fed from detectors 51a, 51a', 52a and 52a' to terminals 71, 72, 81 and 82, while command signals $b_1$, $b_1'$, $b_2$ and $b_2'$ comprising an OFF signal "1" and an ON signal "0" are fed from detectors 51b, 51b', 52b and 52b' to terminals 91, 92, 101 and 102. These directional signals $a_1$, $a_1'$, $a_2$, $a_2'$ and command signals $b_1$, $b_1'$, $b_2$, $b_2'$ are control signals for adjusting the vehicle height. Which of the signal set $a_1$, $b_1$, $a_2$, $b_2$ and the signal set $a_1'$, $b_1'$, $a_2'$, $b_2'$ is to be input to the control circuit can be selected optionally by the operation of the change-over switch 11. The signal set of $a_1$, $b_1$, $a_2$ and $b_2$ is here assumed to be a signal set provided from a detector relating to a first reference vehicle-height position, while the signal set of $a_1'$, $b_1'$, $a_2'$ and $b_2'$ is here assumed to be provided from a detector relating to a second reference vehicle-height position. Each of these reference positions has a certain proper vehicle height range.

Numerals 13 and 14 designate monostable multivibrators attached to the control circuit. A trigger input TR of the monostable multivibrator 13 is connected to a terminal 11b of the change-over switch 11 and its output $\overline{Q}$ is connected to a trigger input TR of the monostable multivibrator 14 and also to a reset terminal R of the monostable multivibrator 3 in the holding circuit $K_1$, while an output $\overline{Q}$ of the monostable multivibrator 14 is connected to a reset terminal R of the monostable multivibrator 5.

In the above construction, when the change-over switch 11 is switched to a terminal 11a or terminal 11b, a high-level signal is fed to the trigger input TR of the monostable multivibrator 13 directly or through a diode 11c. As a result, output $\overline{Q}$ is produced during the period of time decided by a capacitor 15 and a resistor 16, and because this output Q is fed to the reset terminal R of the monostable multivibrator 3, the holding function of the holding circuit $K_1$ at the front side of the vehicle is interrupted until the output $\overline{Q}$ disappears. Then, upon disappearance of the output $\overline{Q}$, the output Q of the monostable multivibrator 14 is energized whereby, in the same manner as above, this output $\overline{Q}$ is fed to the reset terminal R of the monostable multivibrator 5 and the holding function of the holding circuit $K_2$ at the rear side of the vehicle is interrupted for a certain period of time decided by a capacitor 17 and a resistor 18. Thus, in this embodiment, the control circuit is constructed so that immediately after the contacts 7, 8, 9 and 10 are switched over from one position to the other by the operation of the change-over switch 11, first the vehicle height adjustment at the front side of the vehicle is performed and then the same adjustment at the rear side of the vehicle is made by the operation of the monostable multivibrators 13 and 14. The foregoing period of time decided by the capacitor 15 and the resistor 16 and that decided by the capacitor 17 and the resistor 18 are set to a minimum time required for the vehicle height adjustment.

Figure 2:
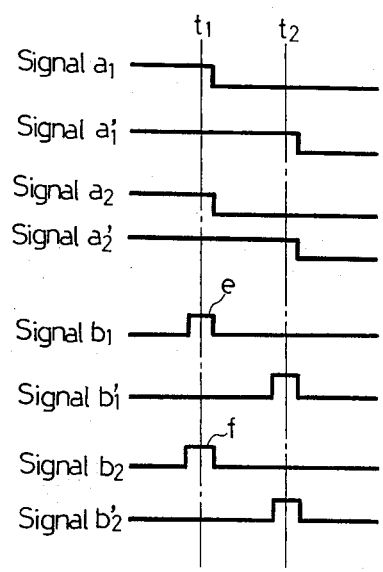
FIG. 2 is a time chart showing an example of signal waveforms which are input to the control circuit.

The operation of the control circuit of FIG. 1 will be explained hereinbelow on the basis of the state of the signals $a_1$, $a_1'$, $a_2$, $a_2'$, $b_1$, $b_1'$, $b_2$ and $b_2'$ shown in FIG. 2.

When the change-over switch 11 is connected to the terminal 11a, the signals $a_1$, $a_2$, $b_1$ and $b_2$ are fed to the input terminals 55a, 56a, 55b and 56b, respectively, so that at time $t_1$ the OFF signal "1" appears at the terminals 55b and 56b and hence on the basis of the operation of the logic circuit (A) the actuator valves 53, 54, the compression means (B) and the decompression means (C) are in a non-operating state. That is, with respect to the first reference vehicle-height position, the vehicle height adjustment is over and consequently the vehicle height is in an appropriate state and the vehicle levelling system is in a non-operating state.

In the above state, if the change-over switch 11 is switched to the terminal 11b to de-energize the relay coil 12, the contacts 7, 8, 9 and 10 are switched over to the opposite positions, so that the signals $a_1$, $a_2'$, $b_1'$ and $b_2'$ relating to the second reference vehicle-height position are fed at a time $t_1$ to the input terminals 55a, 56a, 55b and 56b. In other words, the change is effected from the adjusting state with respect to one reference vehicle-height position to the adjusting state with respect to another reference vehicle-height position. In the adjusting state with respect to the other reference vehicle-height position at time $t_1$, the signals $b_1'$ and $b_2$ are in a state of the ON signal "0", such that unadjusted vehicle height must be adjusted by operating the actuator valves 53, 54, the compression means (B) and the decompression means (C) according to the state of signals fed to the input terminals 55a and 56a. As to the circuit state, however, even if OFF signals "e" and "f" disappear at the terminals 55b and 56b by change-over of the contacts 9 and 10, the holding circuits $K_1$ and $K_2$ operate by the action of the monostable multivibrators 3 and 4 whereby the OFF signals are fed to the control circuit for a certain period of time, and thus it is impossible to make an immediate vehicle height adjustment with respect to the second reference vehicle-height position. But in the control circuit of this invention, as previously noted, is an immediate interlock with the switching action of the change-over switch 11, first the monostable multivibrator 13 is operated to stop the operation of the monostable multivibrator 3, thereby interrupting the holding function of the holding circuit $K_1$ and allowing the vehicle height adjustment at the front side of the vehicle to be performed, and then the monostable multivibrator 14 is operated to stop the operation of the monostable multivibrator 5, thereby interrupting the holding function of the holding circuit $K_2$ and allowing the vehicle height adjustment at the rear side of the vehicle to be performed. The outputs $\overline{Q}$ of the monostable multivibrators 13 and 14 are returned to the original state after the lapse of a certain period of time, whereupon the holding circuits $K_1$ and $K_2$ resume their holding function.

In the signal state at time $t_2$, if the change-over switch 11 is operated counter to the previous operation to switch over from the terminal 11b to the terminal 11a, the relay coil 12 is energized to switch over the contacts 7, 8, 9 and 10, and the monostable multivibrators 13 and 14 operate in the same manner as in the foregoing to temporarily stop the function of the holding circuits $K_1$ and $K_2$, thus allowing the vehicle height adjustment to be performed with respect to the first reference vehicle-height position.

Thus, the vehicle height adjustment in each reference vehicle-height position after change-over of the switch 11 is performed in the order of the front side and then the rear side of the vehicle. But in case the vehicle-height adjusting time at the front side of the vehicle is longer than the preset time of the monostable multivibrator 13 decided by the capacitor 15 and the resistor 16, the next-stage monostable multivibrator 14 starts operation to perform the vehicle height adjustment at the rear side of the vehicle. In this case, however, a front side priority circuit (not shown) operates to eliminate such an inconvenience. In the vehicle height adjustment at the rear side of the vehicle, the amount of pressure stored in a tank as an air pressure source becomes small, with only a pump being relied upon, thus resulting in a longer time required for the vehicle height adjustment than in the adjustment at the vehicle front. In general, therefore, the preset time of the monostable multivibrator 14 decided by the capacitor 17 and the resistor 18 is longer than that of the monostable multivibrator 13.

In the low-pass filters 1 and 2, there occurs a slight time delay between input and output, and this time delay sometimes causes inconvenience at the time of change-over of the switch 11 which temporarily interrupts the function of the OFF signal holding circuits $K_1$ and $K_2$; that is, there sometimes occurs the case where the direction in which the vehicle height should be adjusted becomes opposite. To avoid this inconvenience, analog switch elements 19 and 20 are connected between $i_1-j_1$ and between $i_2-j_2$ of the low-pass filters 1 and 2, respectively, and at the time of operation of the monostable multivibrators 13 and 14 their outputs Q are fed through connection lines (m) and (n) to the analog switch elements 19 and 20 to turn on such analog switch elements, thereby short-circuiting between $i_1-j_1$ and between $i_2-j_2$, whereby the foregoing time delay is lessened.

Although in the above-described embodiment the number of reference vehicle-height positions was set to two, such number is not limited to two. By making various circuit modifications, the present invention is also applicable to the case where the number of reference vehicle-height positions is more than two.

Thus, by setting a plurality of reference vehicle-height positions and by providing switching means at the input section of the control circuit, the vehicle-height adjustment can be effected while selectively changing reference vehicle-height positions, and can be effected smoothly with high reliability.

Figure 3:
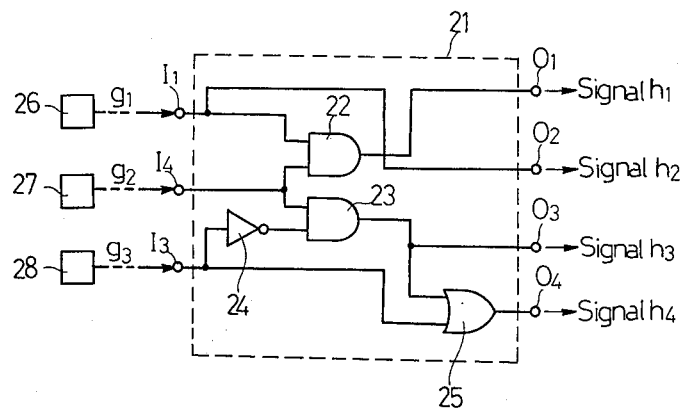
FIG. 3 is a connection diagram of a control signal detecting circuit.

Referring now to FIG. 3, there is shown a control signal detecting circuit. In the control circuit for the vehicle levelling system having the foregoing two reference vehicle-height positions, when the vehicle-height adjustment for example at the vehicle front side is considered, the four signals $a_1$, $a_1'$, $b_1$ and $b_1'$ are needed as control signals for the vehicle-height adjustment. This is also true of the vehicle rear side. Consequently, with respect to one reference vehicle-height position, four detectors corresponding to the aforesaid four signals must be provided. In this case, however, because the number of reference vehicle-height positions increases, the number of detectors to be mounted increases as well, and this causes various inconveniences with regard to circuit configuration. However, by using a signal conversion circuit it is possible to decrease the number of detectors by one.

In FIG. 3, a signal conversion circuit 21 comprises two AND gates 22 and 23, a NOT gate 24 and an OR gate 25, and the connection relation thereof is as shown in FIG. 3. The signal conversion circuit 21 has three input terminals $I_1$, $I_2$, $I_3$ and four output terminals $O_1$, $O_2$, $O_3$, $O_4$.

Figure 4:
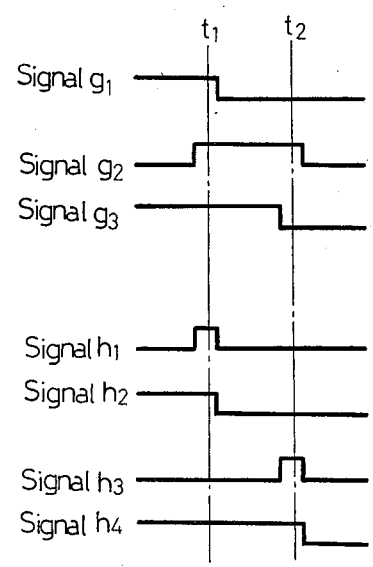
FIG. 4 is a time chart showing the relationship between input and output waveforms in the control signal detecting circuit.
Figure 5:
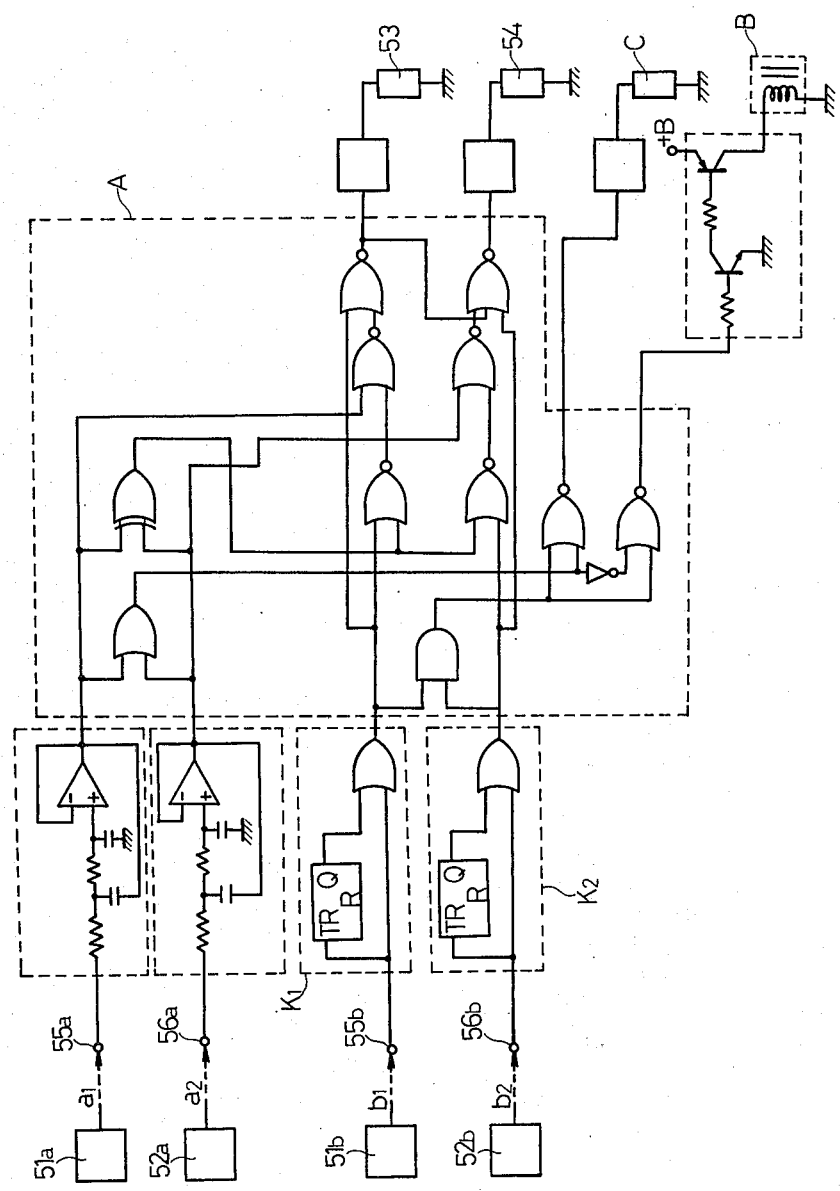
FIG. 5 is a connection diagram of a control circuit on which the control circuit of the present invention is based.

In the above-described circuit configuration, the relation between input and output is here explained with reference to FIG. 3. To the input terminals of the signal conversion circuit 21 there are fed input signals $g_1$, $g_2$ and $g_3$ from detectors 26, 27 and 28, respectively, while in response thereto there are produced signals $h_1$, $h_2$, $h_3$ and $h_4$ at the output terminals $O_1$, $O_2$, $O_3$ and $O_4$, respectively. As is apparent from the comparison between FIGS. 2 and 4, the state of the signals $h_1$, $h_2$, $h_3$ and $h_4$ can be made to correspond to the state of the signals $b_1$, $a_1$, $b_1'$ and $a_1'$. Thus, the signals $a_1$, $b_1$, $a_1'$ and $b_1'$ can be produced by the three signals $g_1$, $g_2$ and $g_3$. Therefore, if the output terminals $O_1$, $O_2$, $O_3$ and $O_4$ of the signal conversion circuit 21 are connected to the terminals 91, 71, 92 and 72 of the foregoing control circuit, respectively, it becomes possible to effect the vehicle height adjustment satisfactorily with the three detectors 26, 27 and 28 without the need of providing four detectors for the signals $a_1$, $b_1$, $a_1'$ and $b_1'$.

The distance between two reference vehicle-height positions corresponds to the difference in height between those reference positions, and when the vehicle-height changes from one reference position to the other, the distance between the two reference positions can be determined from the difference in time $(t_2-t_1)$ from the time when an OFF signal is produced when the vehicle height is within the proper vehicle height range of one reference position until the time when an OFF signal is produced when the vehicle height has entered the proper vehicle height range of the other reference position. Therefore, if the signal conversion circuit 21 of the foregoing construction is employed, the distance between two reference vehicle-height positions, namely, the difference in time $(t_2-t_1)$ between OFF signals, is determined mainly from the relation to the signal $g_2$. Thus, for example, by suitably selecting the output characteristic of the detector 26 relating to the signal $g_1$ and that of the detector 27 relating to the signal $g_2$, even without making a special adjustment on the remaining detector, it is made possible to determine the spacing between reference vehicle-height positions, and adjustment thereof is easy.

Thus, by using the aforesaid control signal detecting circuit 21, the number of detectors can be decreased in the manufacture of a vehicle levelling system having the foregoing control circuit, and consequently the connection relation of detectors is simplified, the size of the entire system is reduced, manufacturing costs are reduced and adjusting operation is simplified.

What is claimed is:

1. In a control circuit for a vehicle levelling system, including:

detecting means for detecting a change in vehicle height with respect to a predetermined reference vehicle-height position and generating a pair of control signals consisting of a directional signal and a command signal, said directional signal indicating whether the direction of displacement is upward or downward and said command signal indicating whether the vehicle height adjustment is to be made or stopped;

control circuit means for controlling the operation of a mechanical system to adjust the vehicle height to said reference position according to said control signals; and a holding circuit which, when said command signal has changed from an adjustment-off signal to an adjustment-on signal, holds said adjustment-off signal for a certain period of time and then allows said adjustment-on signal to be transmitted to said control circuit, the improvement comprising:

said detecting means being constructed so as to detect change in vehicle height with respect to a plurality of different reference vehicle-height positions, each of said reference vehicle-height positions having a predetermined proper vehicle height range;

switching means for selecting any of said plurality of reference vehicle-height positions, said switching means being mounted at the input section of said control circuit means for controlling the operation of said mechanical system; and a circuit for temporarily interrupting the function of said holding circuit at the time of operation of said switching means.

2. A control circuit according to claim 1, wherein said switching means includes operating means therefor, and said circuit for temporarily interrupting the function of said holding circuit operates in accordance with the operation of said operating means.

3. A control circuit according to claim 1, wherein said detecting means is constructed to as so generate said pair of control signals by a number corresponding to the number of said plurality of reference vehicle-height positions.

4. A control circuit according to claim 3, wherein said detecting means is constructed by providing a set including a detector generating said directional signal and a detector generating said command signal by a number corresponding to the number of said plurality of reference vehicle-height positions.

5. A control circuit according to claim 3, wherein said detecting means comprises a lesser number of detectors than the total number of said control signals generated therefrom, and a signal conversion circuit for converting input signals provided from said detectors into said control signals.

6. In a control circuit for a vehicle levelling system, including:

detecting means for detecting a change in vehicle height with respect to a predetermined reference vehicle-height position and generating a pair of control signals consisting of a directional signal and a command signal, said directional signal indicating whether the direction of displacement is upward or downward and said command signal indicating whether the vehicle height adjustment is to be made or stopped;

control circuit means for controlling the operation of a mechanical system to adjust the vehicle height to said reference position according to said control signals; and a holding circuit which, when said command signal has changed from an adjustment-off signal to an adjustment-on signal, holds the adjustment-off signal for a certain period of time and then allows the adjustment-on signal to be transmitted to said control circuit means, the improvement comprising:

switching means for selecting any of said plurality of reference vehicle-height positions, said switching means being mounted at the input section of said control circuit for controlling the operation of said mechanical system; and wherein said detecting means is constructed so as to detect changes in vehicle height with respect to a plurality of different reference vehicle-height positions each having a predetermined proper vehicle height range and is constructed of a lesser number of detectors than the total number of said control signals for generating said pair of control signals by a number corresponding to the number of said plurality of reference vehicle-height positions and a signal conversion circuit for converting input signals provided from said detectors into said control signals.

7. A control circuit according to claim 6, wherein said detecting means comprises three said detectors for detecting changes in vehicle height with respect to two reference vehicle-height positions, and said signal conversion circuit.

8. A control circuit according to claim 7, wherein said signal conversion circuit has three input terminals corresponding to signals provided from said three detectors and four output terminals corresponding to two sets of said directional and command signals.

* * * * *